(12) United States Patent
Whiteaway

(10) Patent No.: US 7,095,923 B1
(45) Date of Patent: Aug. 22, 2006

(54) WAVELENGTH SELECTIVE OPTICAL FILTER

(75) Inventor: James Whiteaway, Sawbrideworth (GB)

(73) Assignee: Nortel Networks Limited, St. Laurent ( * ) Notice: Subject to any disclaimer, the term of this patent is extended or adjusted under 35 U.S.C. 154(b) by 781 days.

(21) Appl. No.: 10/109,903

(22) Filed: Mar. 29, 2002

(51) Int. Cl.
 *G02B 6/34* (2006.01)

(52) U.S. Cl. .......................................... 385/37; 385/14

(58) Field of Classification Search ................. 385/37, 385/14, 129–132, 27–28, 10, 140
See application file for complete search history.

(56) References Cited

U.S. PATENT DOCUMENTS

| 5,629,992 | A | | 5/1997 | Amersfoort et al. | |
|---|---|---|---|---|---|
| 6,137,939 | A | * | 10/2000 | Henry et al. ................. | 385/132 |
| 6,205,273 | B1 | * | 3/2001 | Chen ............................ | 385/37 |
| 6,421,478 | B1 | * | 7/2002 | Paiam .......................... | 385/24 |
| 6,603,892 | B1 | * | 8/2003 | Ticknor ....................... | 385/14 |

OTHER PUBLICATIONS

PHASAR–Based WDM–Devices: Principles, Design and Applications by M K Smit Cor van Dam, published in the IEEE Journal of Selected Topics in Quantum Electronics, vol. 2, No. 2, Jun. 1996.

* cited by examiner

*Primary Examiner*—Nimeshkumar D. Patel
*Assistant Examiner*—Sumati Krishnan
(74) *Attorney, Agent, or Firm*—Barnes & Thornburg LLP

(57) ABSTRACT

The invention is directed to an improved wavelength selective optical filter component having an optical path therethrough and comprising a first and a second optical port, a multimode interference region and a wavelength selective element. The first optical port and the multimode interference region each have an axis of symmetry relative to the optical path. The optical path enables light to travel through the multimode interference region and the wavelength selective element from the first or second optical port to the other optical port, and wherein the axis of symmetry of the multimode interference region is not aligned with the axis of symmetry of the first optical port.

An advantage of arranging the multimode interference region and first optical port such that their axes of symmetry are not aligned is that this introduces a slope in the pass band of the device which can be chosen at the design stage to meet a specific slope requirement or can be used to cancel a pre-existing slope to give a resultant flat pass band.

22 Claims, 17 Drawing Sheets

WAVELENGTH SELECTIVE OPTICAL FILTER

FIELD OF THE INVENTION

The present invention relates to an improved wavelength selective optical filter.

BACKGROUND TO THE INVENTION

An optical communications system comprises a light source, such as a laser, a medium through which the light is transmitted, such as an optical fibre and a means of detecting the light, such as a photodetector. The component containing the light source is known as the transmitter and the component containing the detecting means is known as the receiver. The purpose of a communications system is to transfer information from one place to another. The output from the light source is modulated to encode this information and the modulation is detected by the receiver such that data is transmitted through the system.

The term "light" with reference to an optical communications system is used herein to refer to electromagnetic radiation from any part of the electromagnetic spectrum.

As the requirement to transfer data across an optical communication system increases, there are two techniques which are commonly used to increase the system capacity. The first technique involves increasing the rate at which the light is modulated which permits more data to be transmitted in a given time. The second technique involves using more than one wavelength of light to transmit more than one stream or channel of data concurrently. This second technique is known as wavelength division multiplexing and an optical communications system which uses this technique is called a wavelength division multiplexed system, or WDM system. The first and second techniques are often used in combination by both increasing the modulation rate and using more than one wavelength of light. In reality a stream of data is not transmitted on a single wavelength, but on a small range of wavelengths. The size of the wavelength range is dependent on the exact system implementation, but is typically 0.3 nm for a 10 Gbit/s system. Hereafter the term "wavelength" with reference to a channel of data is taken to mean the centre wavelength of the transmitted light, accepting that there will be a small spread of wavelengths around this value.

A schematic diagram of a simple WDM system is shown in FIG. 1. The system comprises a plurality of transmitters 102 and the output light from each transmitter is of a different wavelength. The output light from each transmitter is combined on to a single transmitting medium 104, such as an optical fibre, by means of an optical multiplexor 106. At the other end of the system, the individual wavelengths are separated by means of an optical demultiplexor 108 and detected by different detectors 110. The optical multiplexors and demultiplexors 106, 108 are examples of optical filters.

An example of a multiplexor or demultiplexor is an arrayed waveguide grating (AWG) or PHASAR based device, hereafter referred to as an AWG. Such devices are discussed in detail in 'PHASAR-Based WDM-Devices: Principles, Design and Applications' by M. K. Smit and Cor van Dam, published in the IEEE Journal of Selected Topics in Quantum Electronics, Vol. 2, No. 2, June 1996, and a basic description is included here.

A schematic layout of a simple 1×4 AWG is shown in FIG. 2. This device has 1 input port 202 and 4 output ports 204. The AWG additionally comprises 2 free propagating regions 206, 208, also known as star couplers, which are connected by a plurality of optical waveguides 210, each of which has a different optical path length. These waveguides 210 are hereafter referred to as the array of waveguides.

The operation of the AWG shown in FIG. 2 when used as a demultiplexor is as follows. A beam of light propagates down the input port 202 and when the beam of light enters the star coupler 206 it is no longer laterally confined and the beam diverges. At the other end of the star coupler 206, the beam is coupled into the array of waveguides 210, and is propagated along these waveguides to the second star coupler 208. The length of the waveguides within the array increases linearly across the array. This results in the focal point moving along the output plane of the second star coupler 212 as the wavelength changes. By placing the output guides 204 at the appropriate positions along this plane 212, a different wavelength or range of wavelengths is coupled to each output port.

The operation of such an AWG is reciprocal, such that the device shown in FIG. 2 could also be used as a multiplexor with guides 204 operating as 4 input ports and guide 202 operating as a single output port. The AWG operated in this manner would combine the 4 different wavelengths input one on each of the ports 204 onto the output port 202.

The term "reciprocal" with reference to the operation of an AWG is used herein to mean that the operation of an AWG is substantially reversible. This can be described with reference to FIG. 2, such that if the AWG was used as a demultiplexor and an input signal on port 202 contained 4 wavelengths, $\lambda_1$, $\lambda_2$, $\lambda_3$, $\lambda_4$, wavelength $\lambda_1$ would be output by the first of the output ports 204, wavelength $\lambda_2$ by the second etc. However, if the same AWG was used as a multiplexor, waveguides 204 become the input ports and waveguide 202 the output port, and if an input signal of wavelength $\lambda_1$ was input on the first input port 204, $\lambda_2$ on the second, $\lambda_3$ on the third and $\lambda_4$ on the fourth, all 4 wavelengths would be combined and output via the output port 202.

An AWG as described above has a pass band shape which is substantially Gaussian. FIG. 3 shows a typical Gaussian transmission profile for 1 of the outputs of an AWG as shown in FIG. 2. In some optical communication systems it is attractive to flatten the pass band of such filters on account of the insensitivity of their insertion loss to the frequency of the transmitted optical signal. FIG. 4 shows an example of a transmission profile for 1 of the outputs of a pass band flattened AWG.

A method of pass band flattening is detailed in U.S. Pat. No. 5,629,992 and FIG. 5 shows a schematic layout of a pass band flattened 1×4 AWG. The AWG in FIG. 5 has all the features of that shown in FIG. 2 and common features have been labelled with the same numbers; an input port 202; two star couplers 206, 208 connected by an array of waveguides 210, and 4 output ports 204. Additionally there is included a multimode element 502. This multimode element is a region which allows propagation of multiple modes of light and could comprise a waveguide structure or a region of free space. When applied to an AWG device, this multimode element can be implemented as a substantially cuboid section of waveguide, hereafter referred to as an MMI section. The MMI section works by being excited by a zero order mode injected into the centre of the input side from a narrower single mode guide. The narrow input field profile excites a mixture of the zero and second order modes in the MMI section, which then move in relative phase by pi radians along the MMI section on account of the different propagation constants of the two modes. The two modes have therefore inverted in relative phase at the output of the MMI section into the star coupler giving rise to a semi-flattened field distribution. The field profile emanating from the MMI section is substantially re-imaged in the output plane of the second star coupler 212. The position of the field profile depends on the wavelength as already discussed. The filter transmission response is given by the overlap integral of the field distribution at the output plane and the zero order mode field profile guided in the output port as a function of wavelength.

FIG. 6 shows an expanded view of the MMI section in FIG. 5. The light is travelling in the direction shown by the arrow 602 from the input guide 202, into the MMI section 502 and then into the star coupler 206. The progression of the field profile through the MMI section as described above is shown by the profiles 604.

Although the techniques described above using MMI sections produce optical filters with flattened pass bands, measurements of such AWGs show a problem with the pass band shape. If an input/output waveguide is not aligned with the centre of the star coupler the pass band has a significant slope. FIG. 7 shows an enlarged view of a section of FIG. 5. The figure shows the second star coupler 208 and output waveguides 702, 704, 706, 708. The centre line of the star coupler is marked 710 and it can be seen that none of the output guides lie on that line. All 4 outputs will therefore suffer slope on the pass band. The degree of slope scales with distance from the centre line measured along the plane of the output guides 212, such that the slope on the pass band of output port 702 will be more severe than that on output port 704. Simulated pass band shapes for output ports 1 and 40 of a 1×40 AWG with a channel spacing of 100 GHz fabricated in silica on silicon planar waveguide technology are shown in FIGS. 8 and 9.

The slope on the pass band is undesirable as it leads to a reduced filter bandwidth, which degrades the performance of the optical communications system.

OBJECT TO THE INVENTION

The invention seeks to provide an improved optical filter which mitigates at least one of the problems described above.

Further benefits and advantages of the invention will become apparent from a consideration of the following detailed description given with reference to the accompanying drawings, which specify and show preferred embodiments of the invention.

SUMMARY OF THE INVENTION

The invention is directed to an improved wavelength selective optical filter component having an optical path therethrough and comprising a first and a second optical port, said first optical port having an axis of symmetry relative to the optical path, a multimode element having an axis of symmetry relative to the optical path and a wavelength selective element. The optical path enables light to travel through the multimode element and the wavelength selective element from one of said first or second optical ports to said other of said first or second optical ports, and wherein the axis of symmetry of the multimode element is not aligned with the axis of symmetry of the first optical port.

An advantage of arranging the multimode element and first optical port such that their axes of symmetry are not aligned is that this introduces a slope in the pass band of the device which can be chosen to meet a specific component requirement or can be used to cancel a pre-existing slope to give a resultant flat pass band.

Preferably the multimode element is arranged adjacent to said first optical port such that the axis of symmetry of the multimode element is offset and substantially parallel to the axis of symmetry of said first optical port.

The light can travel through the optical filter along the optical path from the first optical port to the second optical port or in the opposite direction from the second optical port to the first optical port.

The optical filter can be an arrayed waveguide device or an Echelle grating device.

The wavelength selective element can be a diffraction grating.

The optical filter component can be fabricated from planar waveguide technology using any suitable material combination, including but not limited to silica on silicon, indium phosphide and silicon on silica technologies.

The optical filter component can be used in an optical communications system, including but not limited to use as a multiplexor, demultiplexor or interleaved filter. The optical filter component can also be used within an optical communication network element.

The invention is also directed to an optical communications system containing an optical filter component, said filter component having an optical path there through and comprising a first and a second optical port, said first optical port having an axis of symmetry relative to the optical path, a multimode element having an axis of symmetry relative to the optical path and a wavelength selective element, wherein the optical path enables light to travel through the multimode element and the wavelength selective element from one of said first or second optical ports to said other of said first or second optical ports, and wherein the axis of symmetry of the multimode element is not aligned with the axis of symmetry of the first optical port.

An advantage of using such a filter in an optical communications system is that the filter can have a substantially flat pass band. A sloping pass band results in degradation of the signal passing through the filter because some of the signal is attenuated more than the rest. This leads to an increased error rate in the transmission of data which is undesirable. A flat pass band removes this problem.

The preferred features may be combined as appropriate, as would be apparent to a skilled person, and may be combined with any of the aspects of the invention.

BRIEF DESCRIPTION OF THE DRAWINGS

Reference will now be made, by way of example, to the accompanying drawings, in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
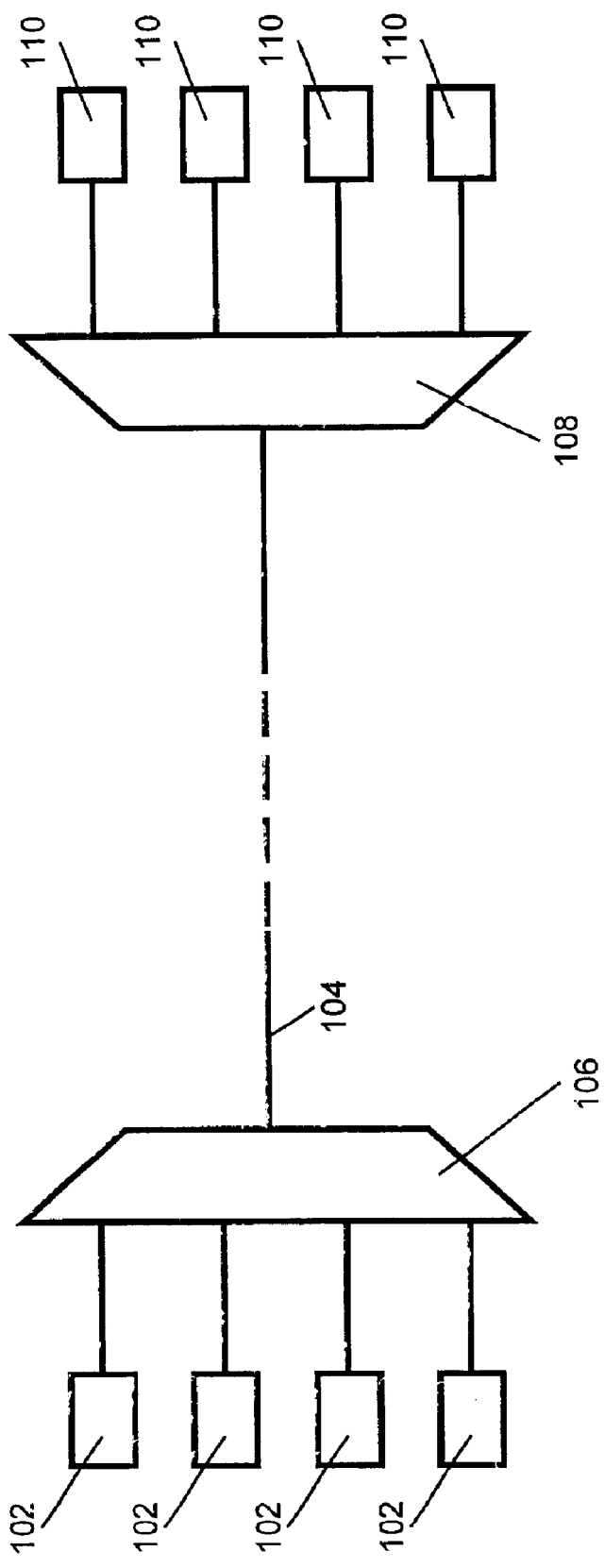
FIG. 1 shows a schematic diagram of a Prior Art WDM optical communications system.
Figure 2:
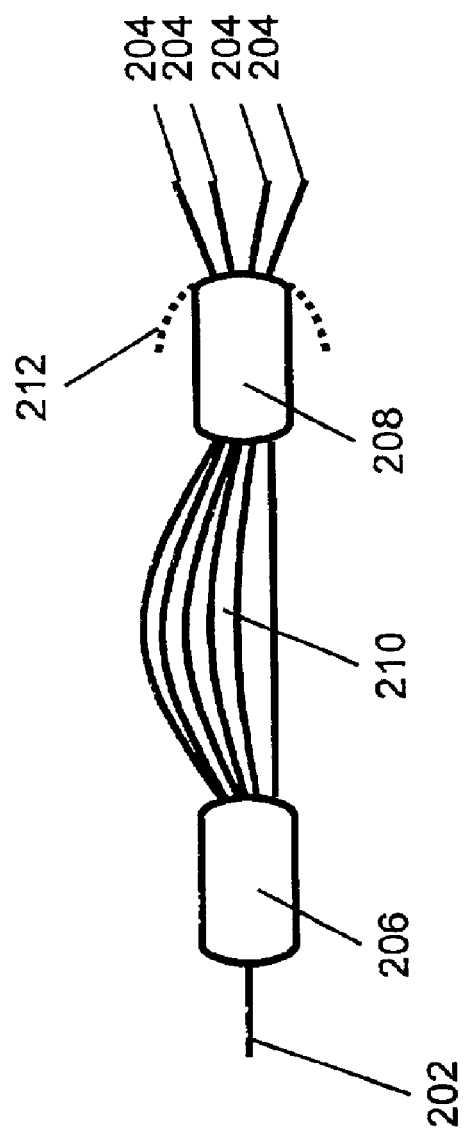
FIG. 2 shows a schematic diagram of a Prior Art AWG device.
Figure 3:
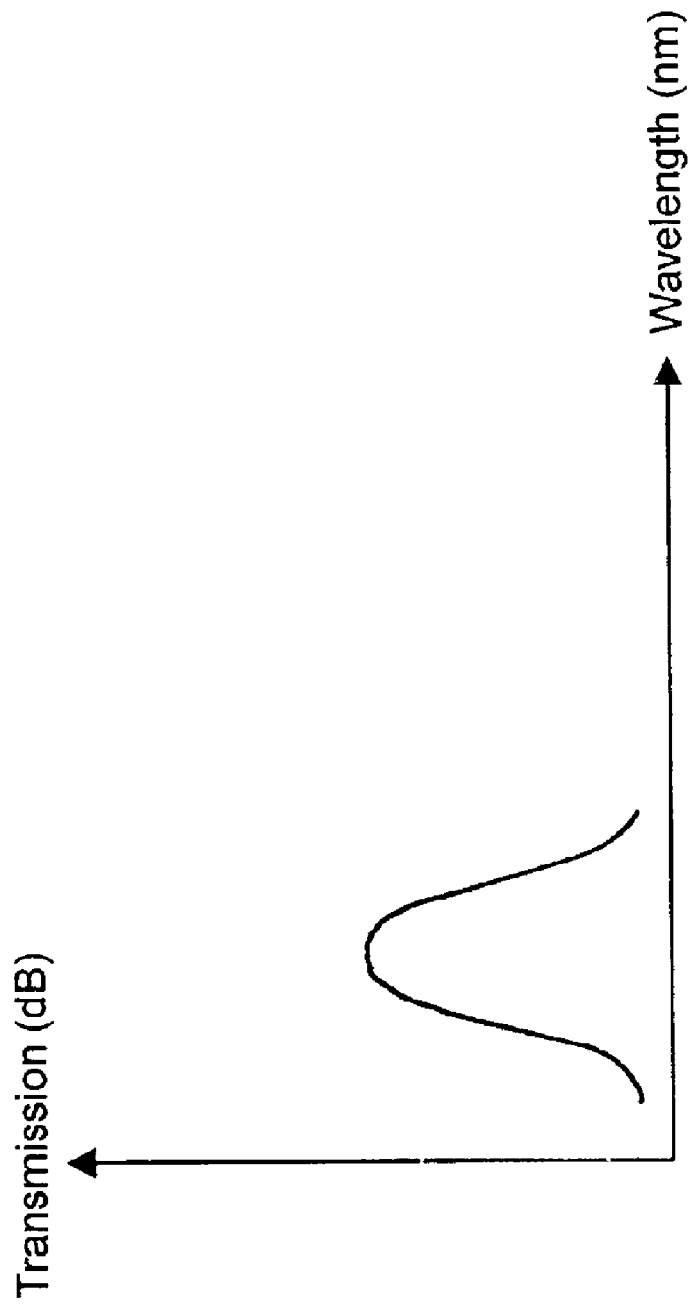
FIG. 3 shows the pass band shape of the AWG in FIG. 2.
Figure 4:
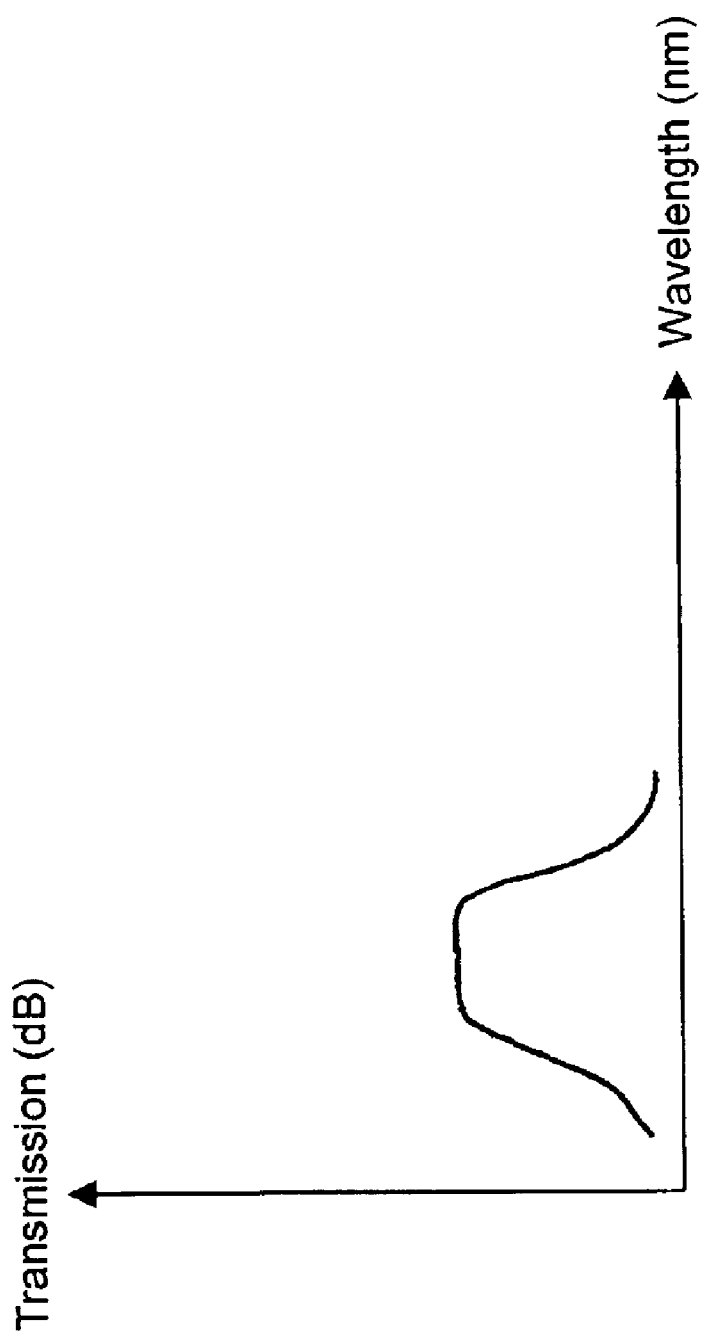
FIG. 4 shows the pass band shape of a Prior Art pass band flattened AWG device.
Figure 5:
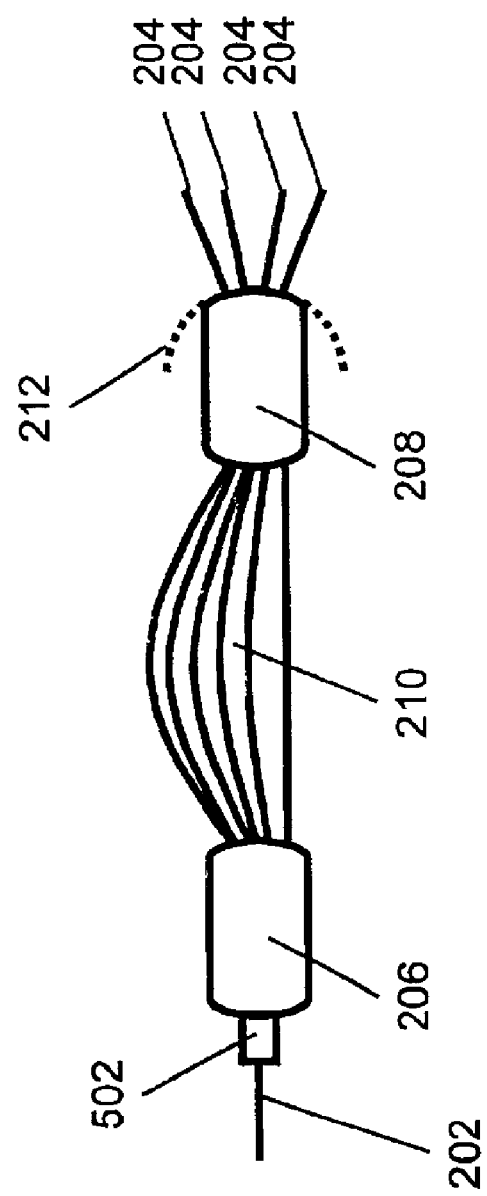
FIG. 5 shows a pass band flattened AWG.
Figure 6:
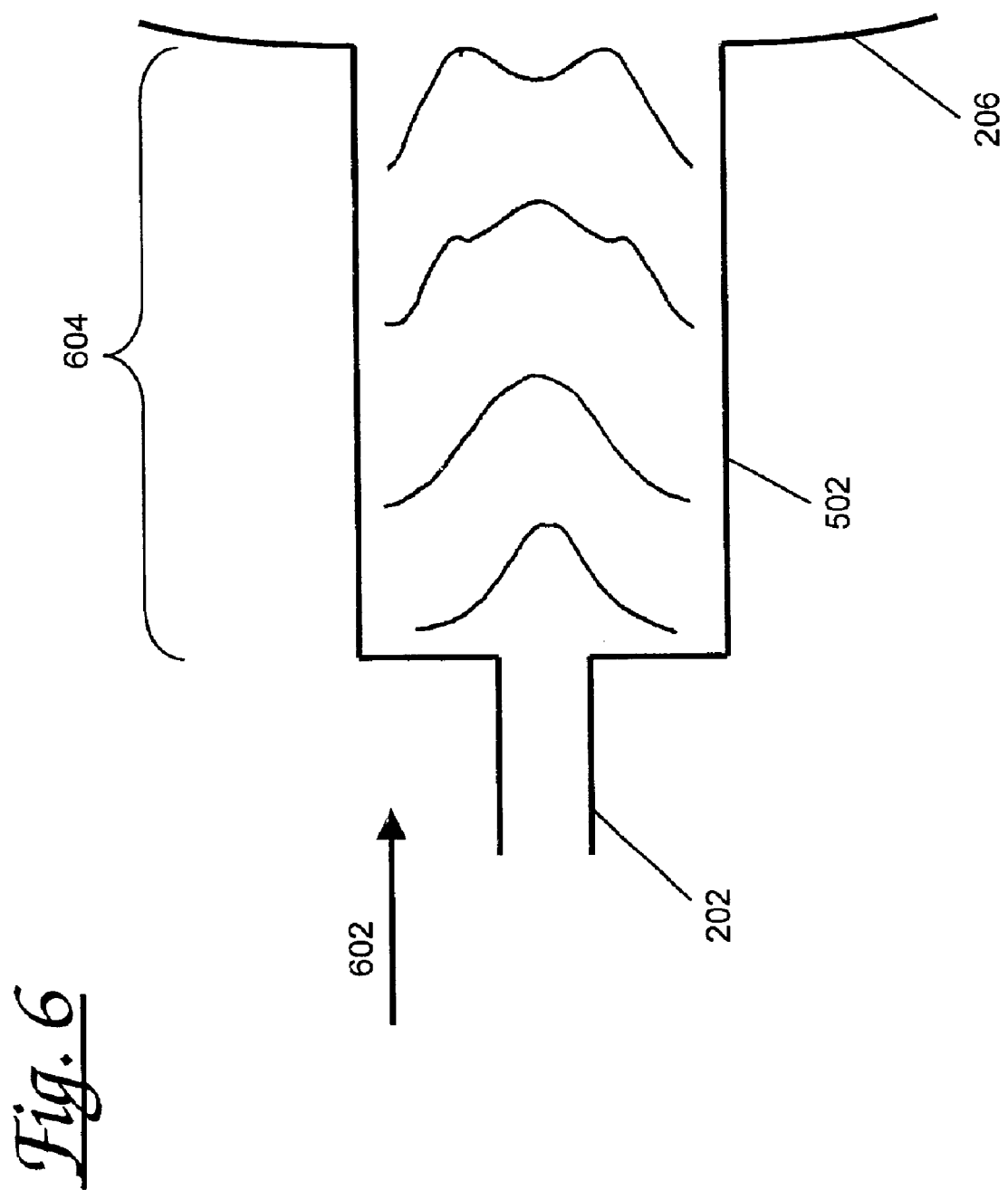
FIG. 6 shows an expanded section of FIG. 5.
Figure 7:
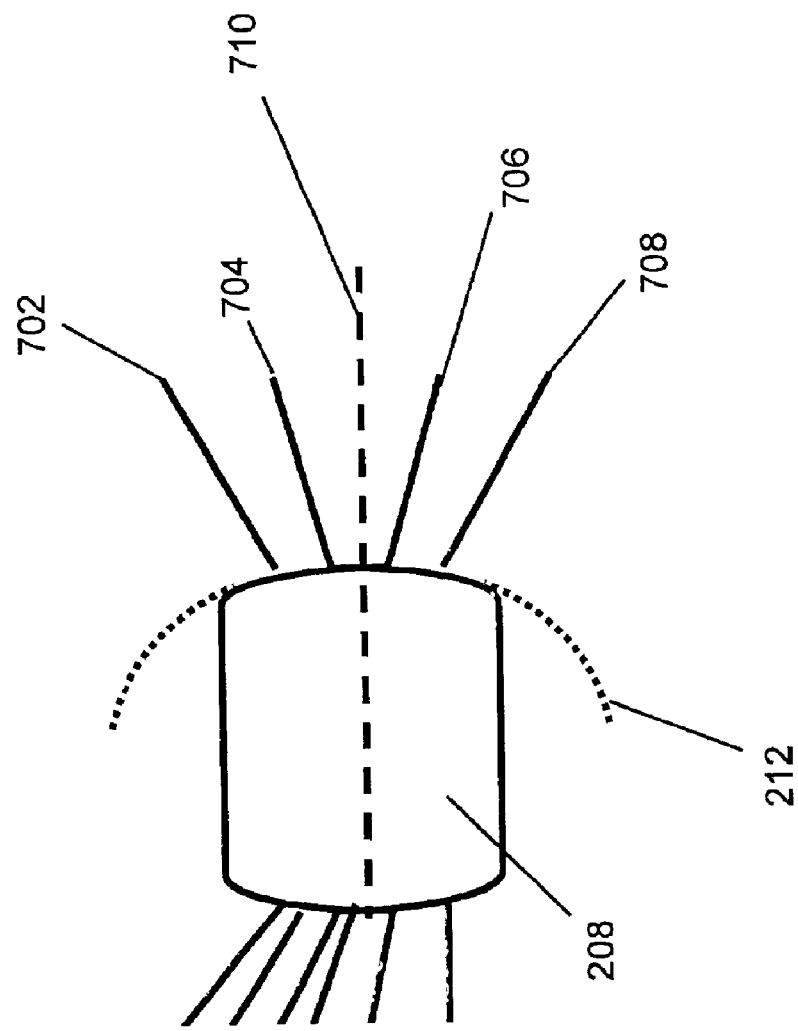
FIG. 7 shows an expanded section of FIG. 5.
Figure 8:
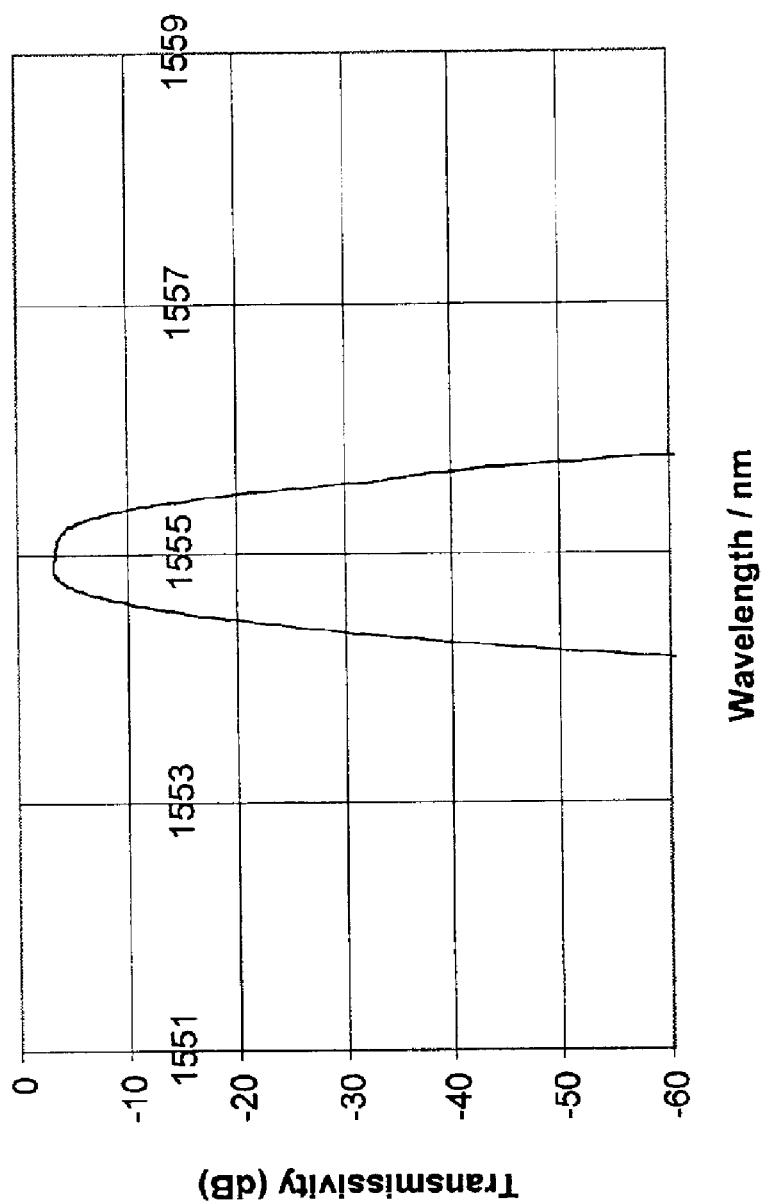
FIG. 8 shows a Prior Art simulated pass band shape for output port 1 of a 1×40 AWG fabricated in silica on silicon technology.
Figure 9:
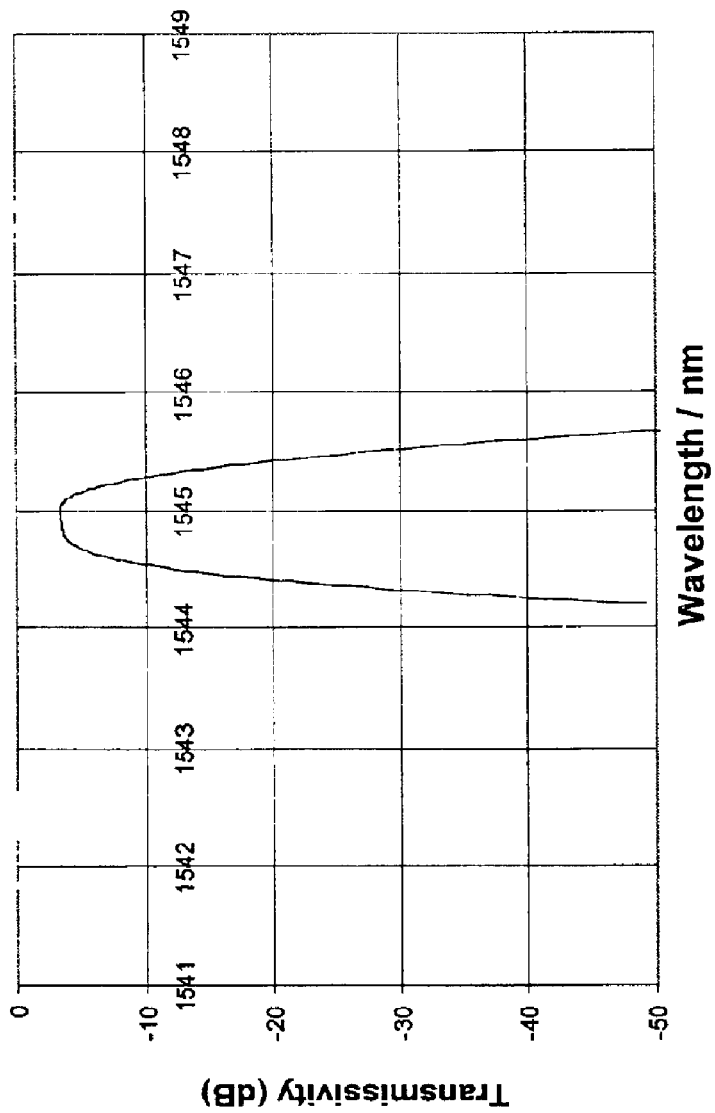
FIG. 9 shows a Prior Art simulated pass band shape for output port 40 of a 1×40 AWG demultiplexor fabricated in silica on silicon technology.
Figure 10:
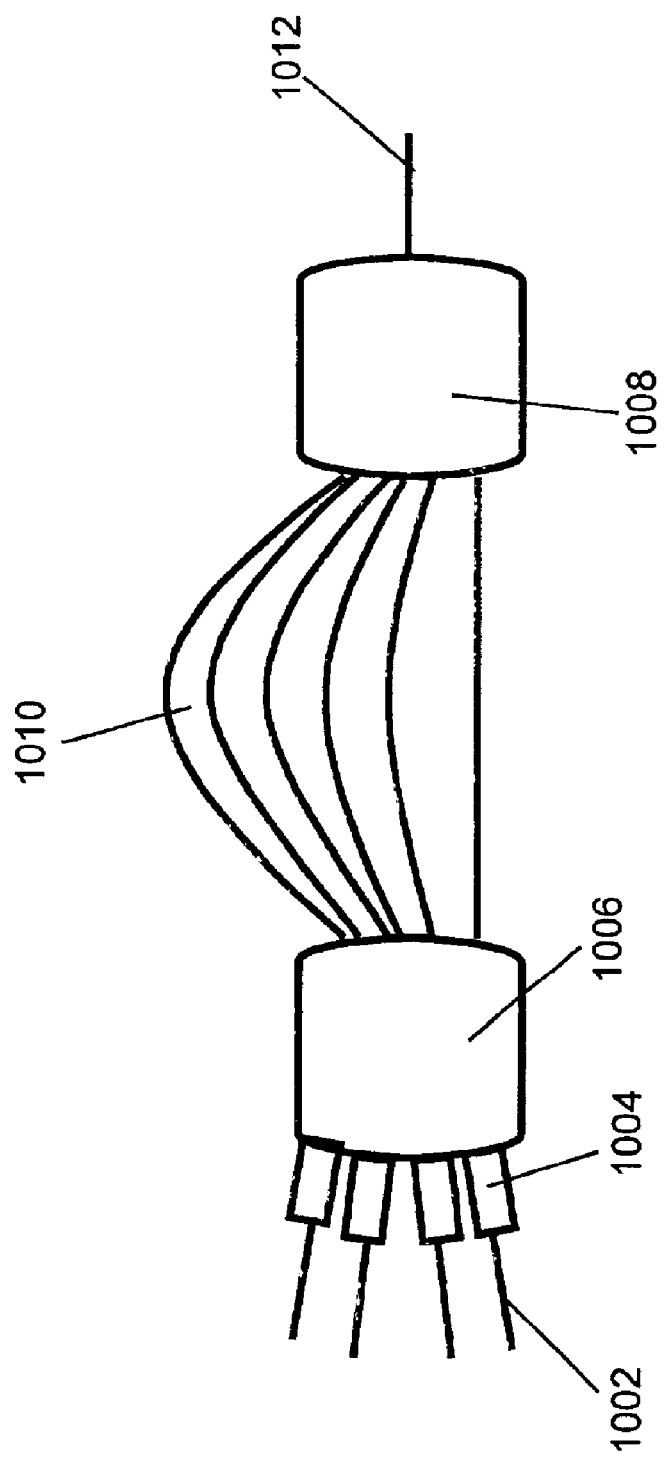
FIG. 10 shows a pass band flattened AWG with slope correction according to a first aspect of the present invention.
Figure 11:
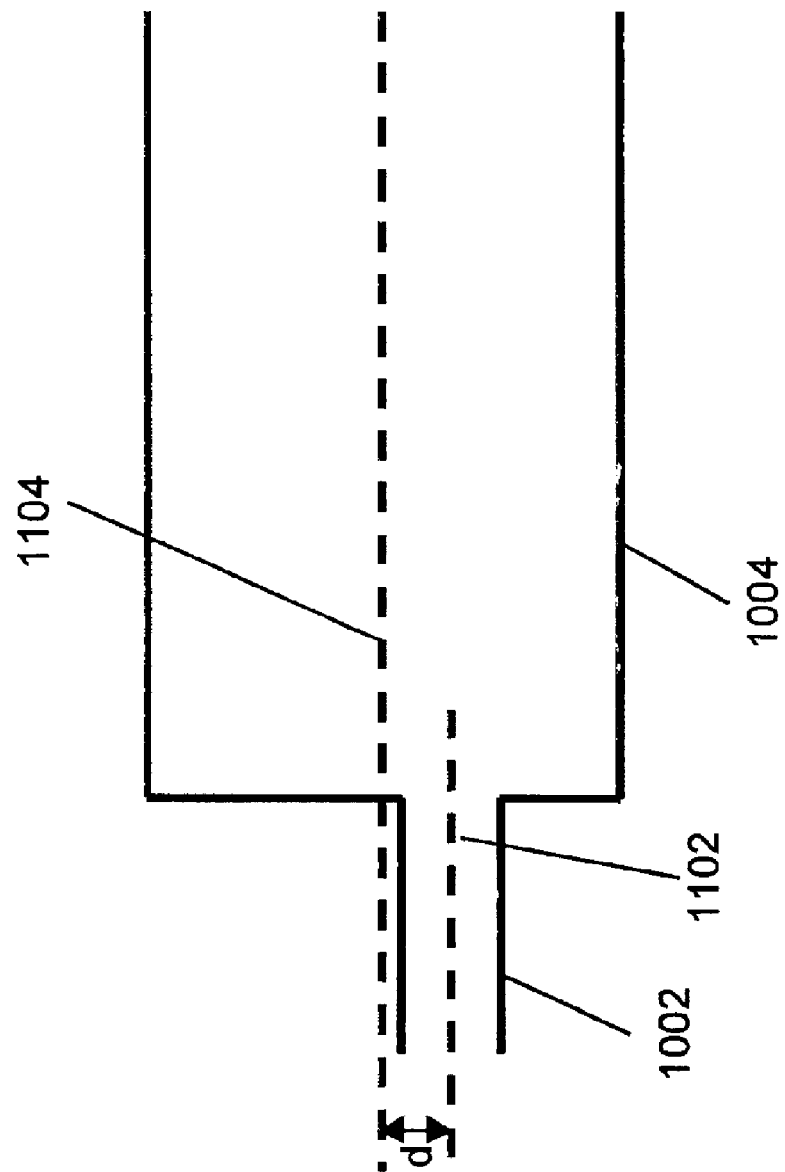
FIG. 11 shows an expanded view of a section of FIG. 12.
Figure 12:
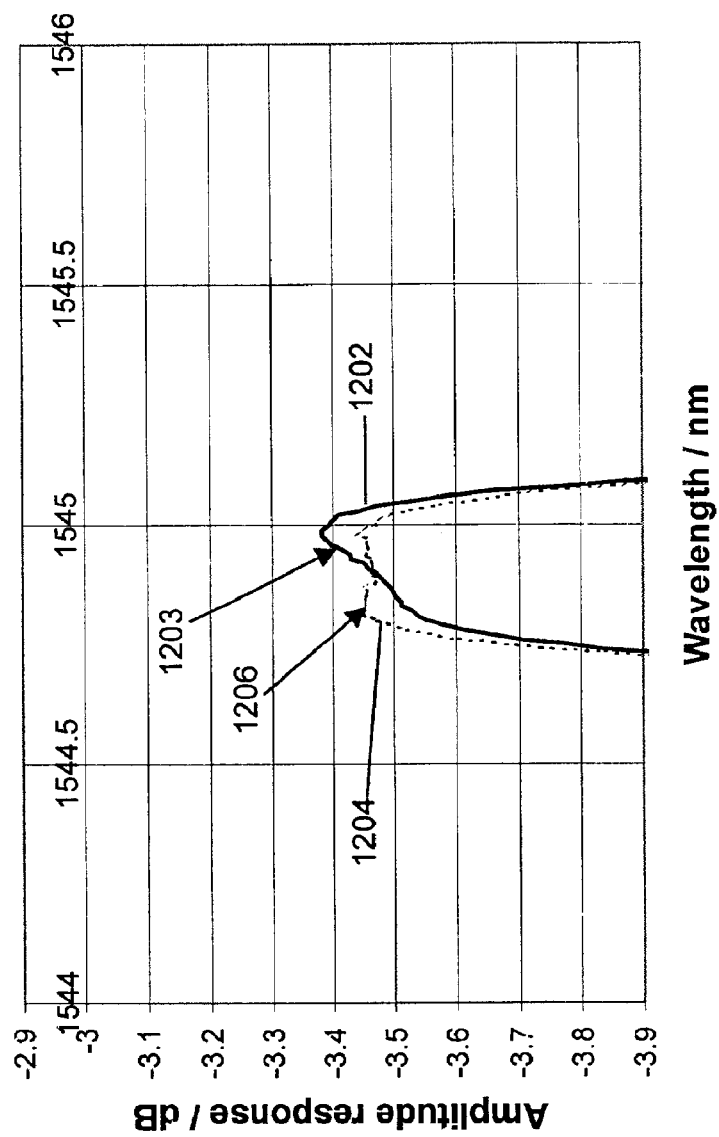
FIG. 12 shows the simulated pass band shape for port 1 of a 40×1 AWG multiplexor fabricated in silica on silicon technology according to a first aspect of the present invention.

Referring to FIGS. 10–12, there is shown a first example of the present invention. FIG. 10 shows a pass band flattened 1×4 AWG comprising 4 input ports 1002, 4 MMI sections 1004, 2 star couplers 1006, 1008, an array of waveguides 1010 and an output port 1012. The input ports 1002 are each connected to the first star coupler 1006 by means of an MMI section 1004. The first and second star couplers 1006, 1008 are connected by the array of waveguides 1010. The output port 1012 is connected directly to the second star coupler 1008.

Referring to FIG. 11, there is shown an expanded view of a section of FIG. 10. The expanded view shows one of the four input ports 1002 and one of the 4 MMI sections 1004. Each input port 1002 is joined to an MMI section 1004. An axis of symmetry of the input port 1002 is defined relative to the optical path and is shown in FIG. 11 by a dashed line 1102. An axis of symmetry of the MMI section 1004 is defined relative to the optical path and is shown in FIG. 11 by a dashed line 1104. The input port and MMI section are arranged adjacent to each other such that the axes of symmetry are parallel but not aligned, such that their separation d is not equal to zero. In the Prior Art, the axes are aligned such that d is equal to zero. This offset of the axis of symmetry of the input port from that of the MMI section causes a mixture of the zero, first, and second order modes to be excited within the MMI section. This results in a slope on the field profile at the output of the MMI section, which in turn puts a slope on the transmission pass band. This deliberately introduced pass band slope substantially cancels the slope resulting from the input waveguides being placed off-centre from the star coupler.

The flattening achieved by offsetting the input port from the MMI section is shown in FIG. 12. FIG. 12 shows simulation results for a 40×1 AWG multiplexor with 5000 GHz free spectral range (FSR) fabricated in silica on silicon planar waveguide technology. The FSR of an AWG device describes its periodicity, whereby if any pair of input and output port are chosen, and the input signal is scanned in frequency, a periodic response is received at the output port such that the spacing of the transmission peaks is defined as the FSR.

In FIG. 12 the trace 1202 shows the pass band shape when the axes of symmetry of the input port and the MMI section are aligned as in the Prior Art and a significant slope 1203 is clearly shown. The trace 1204 shows the pass band shape when the axes of symmetry of the input port and the MMI section are parallel but offset and the pass band has a substantially flat top 1206.

This first example relates to an AWG device used as a multiplexor. Due to the reciprocity of an AWG, the device could also have been used as a demultiplexor. The AWG could be fabricated from any planar waveguide technology including but not limited to silica on silicon, indium phosphide and silicon on silica. This technique of offsetting axes of symmetry of an optical port and the MMI section is not specific to AWG components. It could also be applied to optical filter components based on other technologies including but not limited to free space diffraction gratings and Echelle gratings. This technique is not specific to producing an optical filter with a pass band without a slope, and it could be used in a device where a specific slope across the pass band is required.

Figure 13:
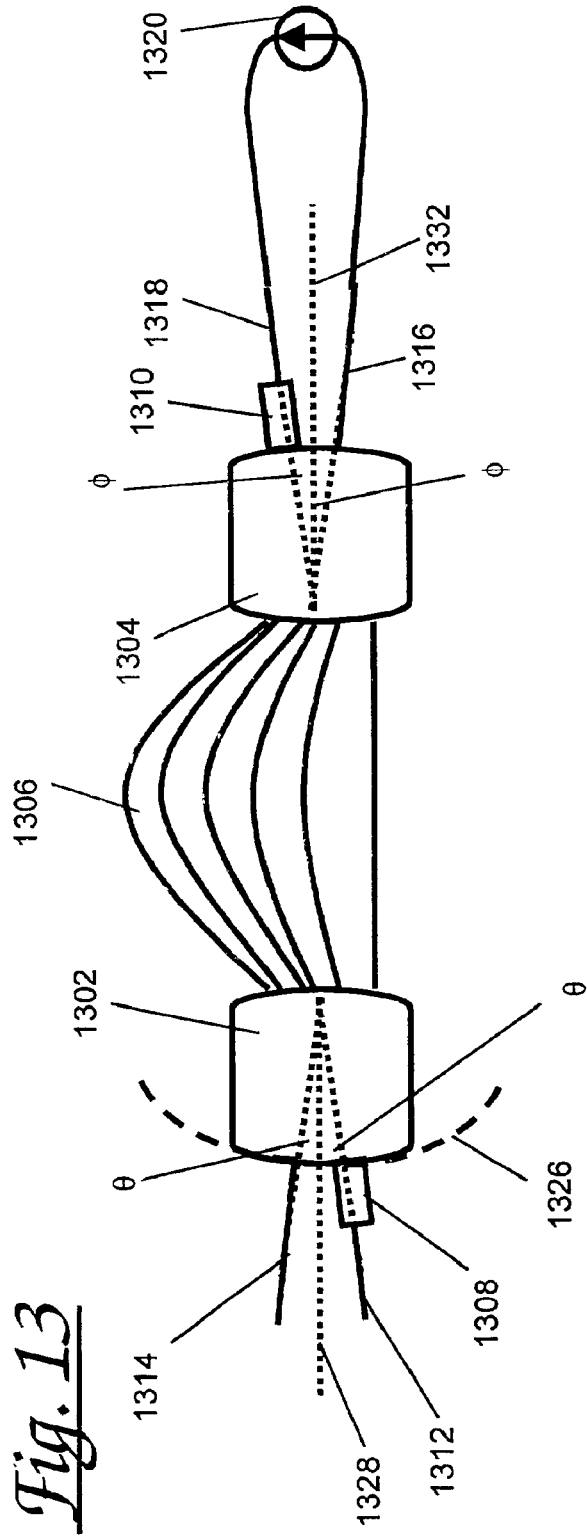
FIG. 13 shows an ILF device with slope correction according to a second aspect of the present invention.
Figure 13B:
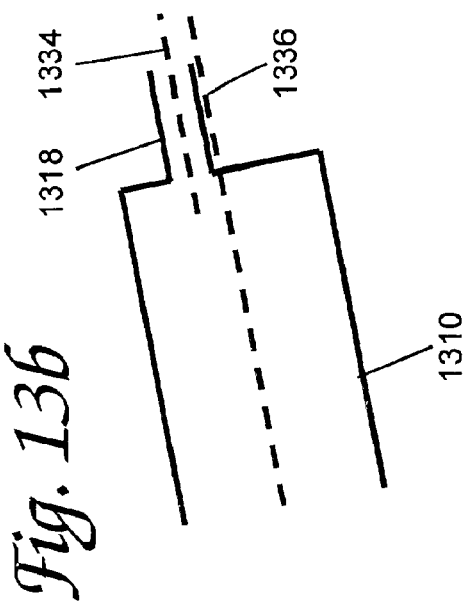
FIG. 13b shows an expanded view of a second section of FIG. 13.
Figure 13A:
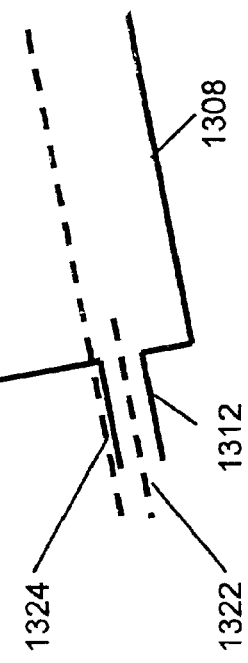
FIG. 13a shows an expanded view of a section of FIG. 13.

Referring to FIGS. 13, 13a, 13b and 14, there is shown a second example of the present invention. FIG. 13 shows an interleaved filter device (ILF) comprising 2 star couplers 1302, 1304 an array of waveguides 1306, 2 MMI sections 1308, 1310, 4 waveguides 1312, 1314, 1316, 1318, and an optical isolator 1320. The optical input port is waveguide 1312, which is joined end to end to an MMI section 1308. Referring to FIG. 13a, the waveguide 1312 and the MMI section 1308 are aligned such that the axis of symmetry of the waveguide, shown in FIG. 13a by a dashed line 1322, is offset from the axis of symmetry of the MMI section, shown in FIG. 13a by a dashed line 1324. Referring to FIG. 13, the MMI section 1308 is joined to the first star coupler 1302 along the input/output plane of this star coupler 1326 and is offset from the centre line of the star coupler 1328 by an angle θ. The optical output port is waveguide 1314 which is joined to the input/output plane 1326 of the first star coupler 1302 and is offset by an angle θ from the centre line of the star coupler 1328 to the opposite side of this line from the MMI section 1308. The first star coupler 1302 is joined to the second star coupler 1304 by means of an array of waveguides 1306. A waveguide 1316 is joined to the input/output plane of the second star coupler 1330, and is offset from the centre line of the star coupler 1332 by an angle φ. An MMI section 1310 is also joined to the input/output plane of the second star coupler 1330, and is offset to the other side of the centre line of the star coupler 1332 from the waveguide 1316 by the angle φ. Usually the angles θ and φ are equal. A waveguide 1318 is joined to the MMI section 1310 at the opposite end from the star coupler 1304. Referring to FIG. 13b, the waveguide 1318 and the MMI section 1310 are aligned such that the axis of symmetry of the waveguide, shown in FIG. 13b by a dashed line 1334, is parallel to but offset from the axis of symmetry of the MMI section, shown in FIG. 13b by a dashed line 1336. Referring to FIG. 13, the opposite end of waveguide 1318 is optically joined to the output port of an optical isolator 1320. Waveguide 1316 is optically joined to the input port of the optical isolator 1320.

The device shown in FIG. 13 can be considered as two separate ILFs which share the two star couplers and the array of waveguides. The first ILF has an input port 1312 and an output port 1316. The offset of the axis of symmetry of the input port 1312 from that of the adjoined MMI section 1308 results in a slope across the device pass band which corrects for the slope introduced because neither the input or output port is aligned to the centre line of the respective star coupler. The second ILF has an input port 1318 and an output port 1314. Similarly the offset of the axis of symmetry of the input port 1318 from that of the adjoined MMI section 1310 results in a slope across the device pass band which corrects for the slope introduced because neither the input or output port is aligned to the centre line of the respective star coupler.

Figure 14:
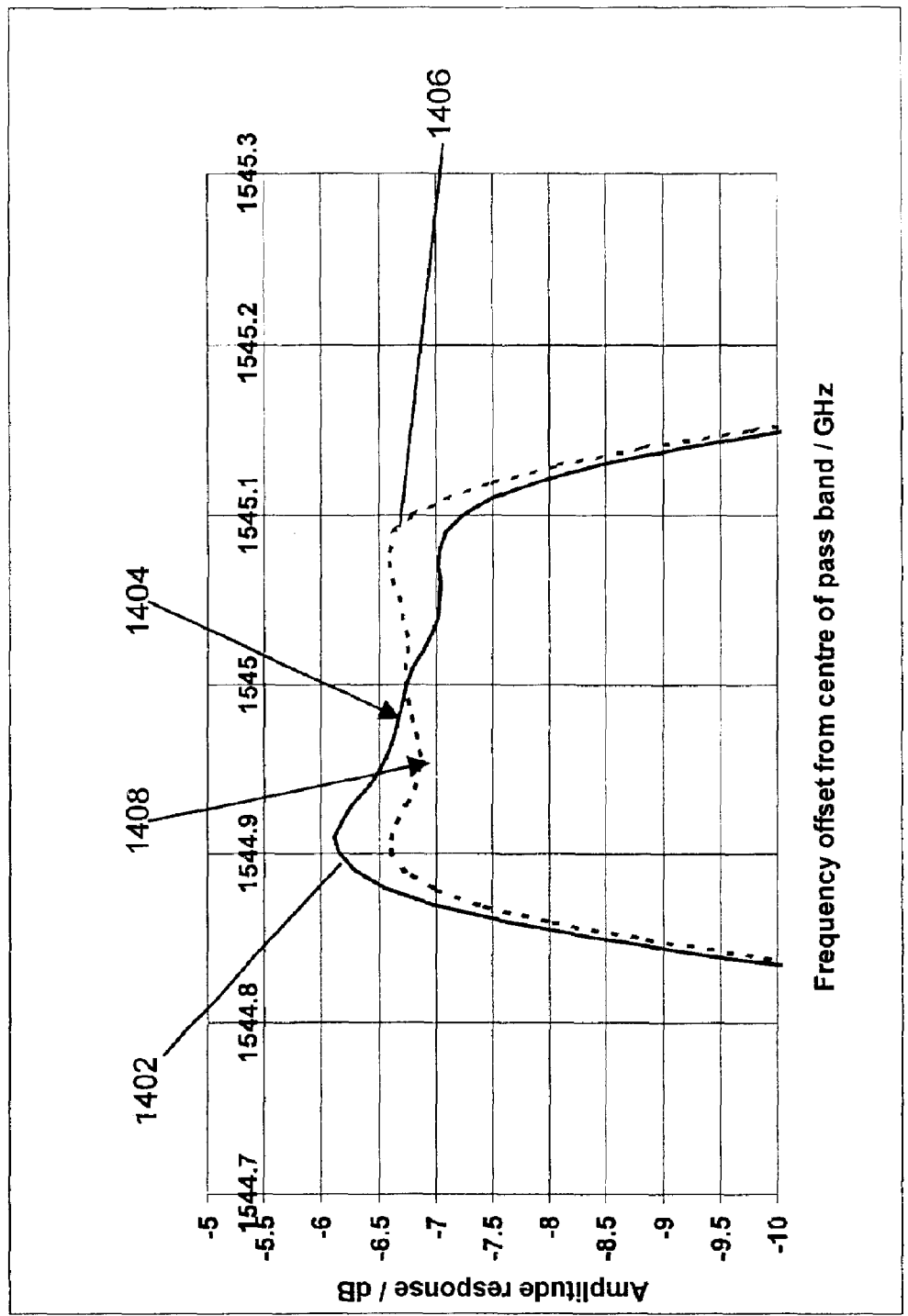
FIG. 14 shows the simulated results for the device in FIG. 13.

FIG. 14 shows the simulated results for an ILF device as shown in FIG. 13 fabricated in silica on silicon technology. The trace 1402 shows the pass band shape when the axes of symmetry of the input port and the MMI section are aligned and a significant slope is clearly shown 1404. The trace 1406 shows the pass band shape when the axes of symmetry of the input port and the MMI section are parallel but offset and the pass band has a substantially flat top 1408.

The ILF device described above was based on planar waveguide technology and could be fabricated using any planar waveguide technology, including but not limited to silica on silicon, indium phosphide or silicon on silica. The technique is also applicable to any ILF component, or other optical filter device, which uses an MMI region for pass band flattening, including ILFs based on free space diffraction gratings and Echelle gratings. This technique is not specific to producing a pass band without a slope, and it could be used in a device where a specific slope across the pass band is required.

Figure 15:
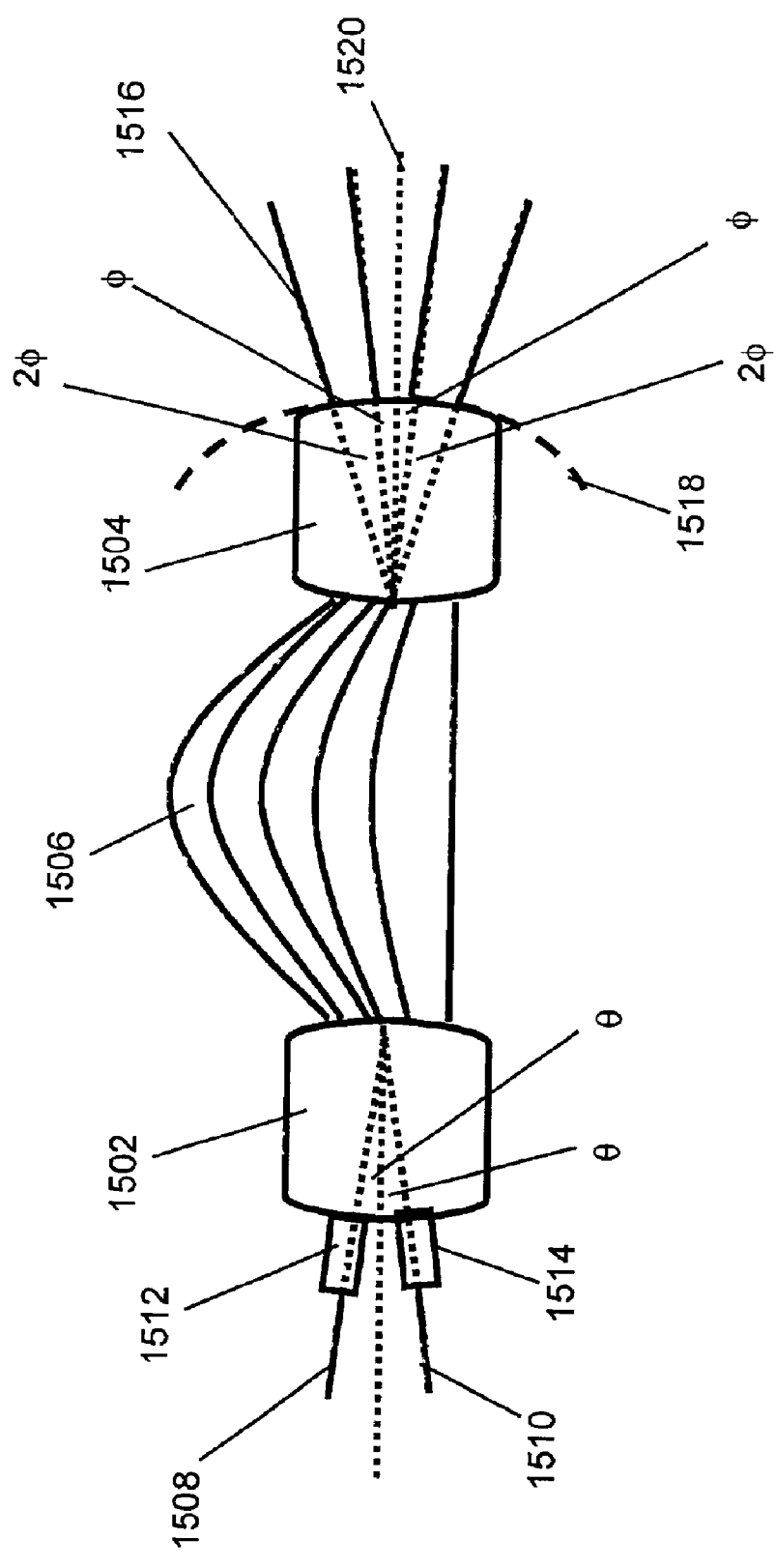
FIG. 15 shows a 2×4 AWG demultiplexor according to a third aspect of the present invention.
Figure 16:
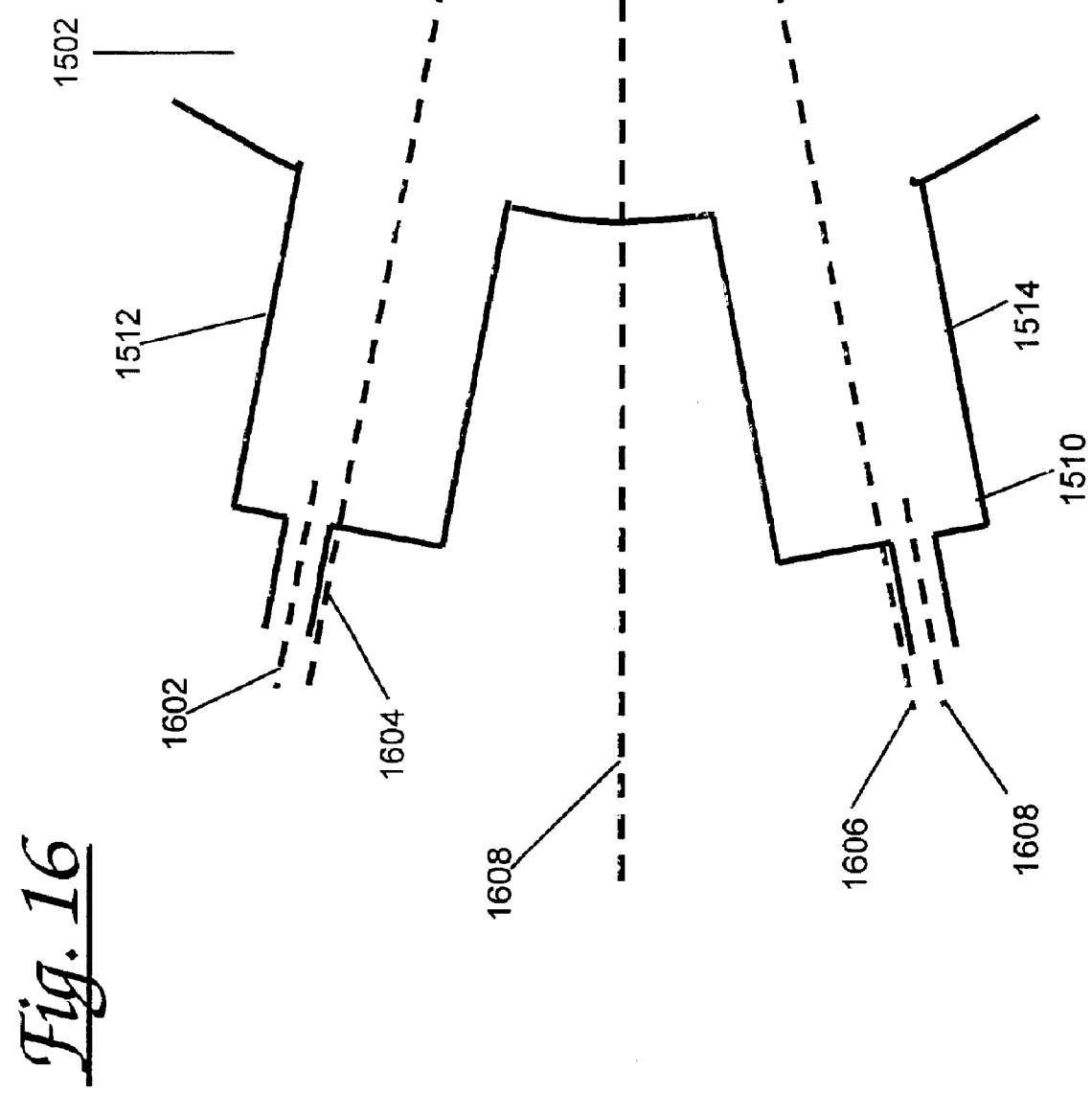
FIG. 16 shows an expanded view of a section of FIG. 15.
Figure 17:
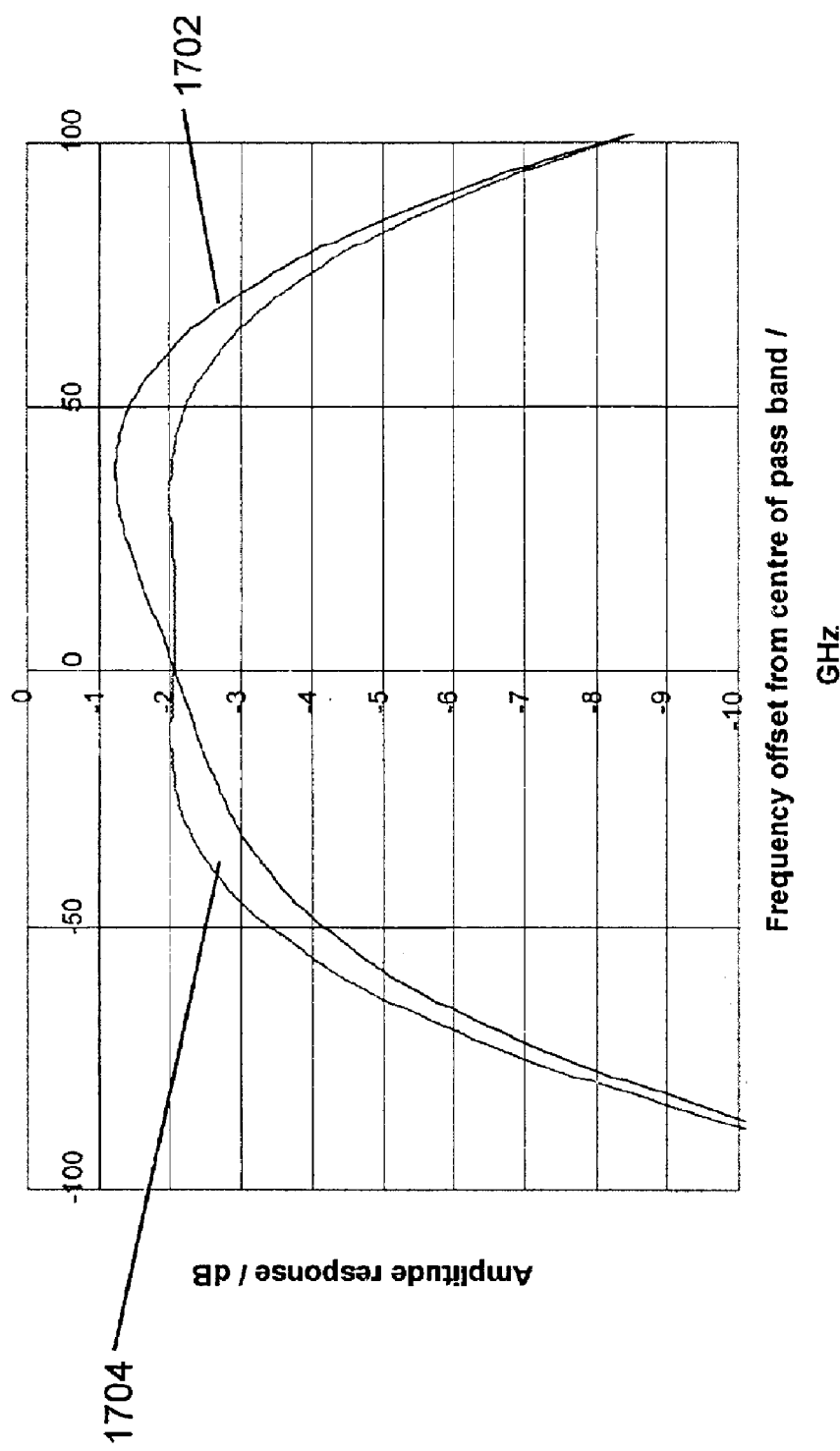
FIG. 17 shows the simulated pass band shape for the device shown in FIG. 15.

A third example of the present invention is shown with reference to FIGS. 15–17. FIG. 15 shows a 2×4 AWG. The device comprises two star couplers 1502, 1504, an array of waveguides 1506, two input ports 1508, 1510, two MMI sections 1512, 1514 and four output ports 1516. The two star couplers 1502, 1504 are connected by the array of waveguides 1506. The 4 output ports 1516 which are waveguides are joined to the second star coupler 1504 along the output plane of the star coupler 1518 and are arranged such that there is a constant angle 2φ between any two adjacent waveguides, and such that the two central waveguides are joined either side of the centre line of the star coupler 1520 such that the angle between each waveguide and the central line is φ. FIG. 16 shows an expanded section of FIG. 15. The MMI sections 1514, 1514 are joined to the input plane of the first star coupler 1502 such that the axes symmetry of the MMI sections 1604, 1606 are on either side of the centre line of the star coupler 1608, separated from this line by an angle θ. The waveguide 1508 is joined to the end of the MMI section 1512 furthest from the star coupler. The waveguide section is aligned such that the axis of symmetry of the waveguide 1602 is parallel to, but offset from, the axis of symmetry of the MMI section 1604. The waveguide 1510 is joined to the end of the MMI section 1514 furthest from the star coupler. The waveguide section is aligned such that the axis of symmetry of the waveguide 1608 is parallel to, but offset from, the axis of symmetry of the MMI section 1606. The offset of the axes of symmetry of input waveguides from the axes of symmetry of the MMI sections results in a slope across the pass band of the device. This cancels the slope which is introduced because the MMI sections 1512, 1514 are not aligned to the centre of the first star coupler, such that the resulting pass band shape has a substantially flat top. Simulation results for such a device with a 100 GHz channel spacing and 800 GHz FSR fabricated in silica on silicon technology are shown in FIG. 17. The line 1702 shows the pass band shape where there is zero offset between the centre line of the input waveguide. The line 1704 shows the pass band shape for a device where there was an offset between the axis of symmetry of the input waveguide and the axis of symmetry of the MMI section. By comparison of these two traces, the flattening effect of the technique described can be seen clearly.

Here it is described as a demultiplexor, however, due to the reciprocal nature of the device, it could also be used a multiplexor.

What is claimed is:

1. An optical filter component having an optical path therethrough and comprising a first and a second optical port, said first optical port having an axis of symmetry relative to the optical path, a multimode element having an axis of symmetry relative to the optical path and a wavelength selective element, wherein the optical path enables light to travel through the multimode element and the wavelength selective element from one of said first or second optical ports to said other of said first or second optical ports, and wherein the axis of symmetry of the multimode element is not aligned with the axis of symmetry of the first optical port.

2. An optical filter component as claimed in claim 1 where the multimode interference region is arranged adjacent to said first optical port such that the axis of symmetry of the multimode element is offset and substantially parallel to the axis of symmetry of said first optical port.

3. An optical filter component as claimed in claim 1 wherein the direction of travel of light is from the second optical port to the first optical port.

4. An optical filter component as claimed in claim 1 which is an arrayed waveguide device.

5. An optical filter component as claimed in claim 4 which is fabricated from silica on silicon technology.

6. An optical filter component as claimed in claim 4 which is fabricated from indium phosphide technology.

7. An optical filter component as claimed in claim 4 which is fabricated from silicon on silica technology.

8. An optical filter component as claimed in claim 1 which is an Echelle grating device.

9. An optical filter component as claimed in claim 8 which is fabricated from silica on silicon technology.

10. An optical filter component as claimed in claim 8 which is fabricated from indium phosphide technology.

11. An optical filter component as claimed in claim 8 which is fabricated from silicon on silica technology.

12. An optical filter component as claimed in claim 1 where the wavelength selective element is a diffraction grating.

13. An optical filter component as claimed in claim 12 which is fabricated from silica on silicon technology.

14. An optical filter component as claimed in claim 12 which is fabricated from indium phosphide technology.

15. An optical filter component as claimed in claim 12 which is fabricated from silicon on silica technology.

16. An optical filter component as claimed in claim 1 for use as a wavelength division multiplexor.

17. An optical filter component as claimed in claim 1 for use as a wavelength division demultiplexor.

18. An optical filter component as claimed in claim 1 for use as an interleaved filter.

19. An optical communications network element containing an optical filter component as claimed in claim 1.

20. An optical filter component as claimed in claim 2 wherein the direction of travel of light is from the second optical port to the first optical port.

21. A method of reducing the passband slope of an optical filter component, said optical filter component having an optical path therethrough and comprising a first and a second optical port, said first optical port having an axis of symmetry relative to the optical path, a multimode element having an axis of symmetry relative to the optical path and a wavelength selective element, wherein the optical path enables light to travel through the multimode element and the wavelength selective element from one of said first or second optical ports to said other of said first or second optical ports, and wherein the axis of symmetry of the multimode element is not aligned with the axis of symmetry of the first optical port.

22. An optical communications system containing an optical filter component, said filter component having an optical path therethrough and comprising a first and a second optical port, said first optical port having an axis of symmetry relative to the optical path, a multimode element having an axis of symmetry relative to the optical path and a wavelength selective element, wherein the optical path enables light to travel through the multimode element and the wavelength selective element from one of said first or second optical ports to said other of said first or second optical ports, and wherein the axis of symmetry of the multimode element is not aligned with the axis of symmetry of the first optical port.

* * * * *